July 18, 1961 H. L. WEBB 2,992,503
GAME BLIND
Filed Sept. 18, 1959 2 Sheets-Sheet 1
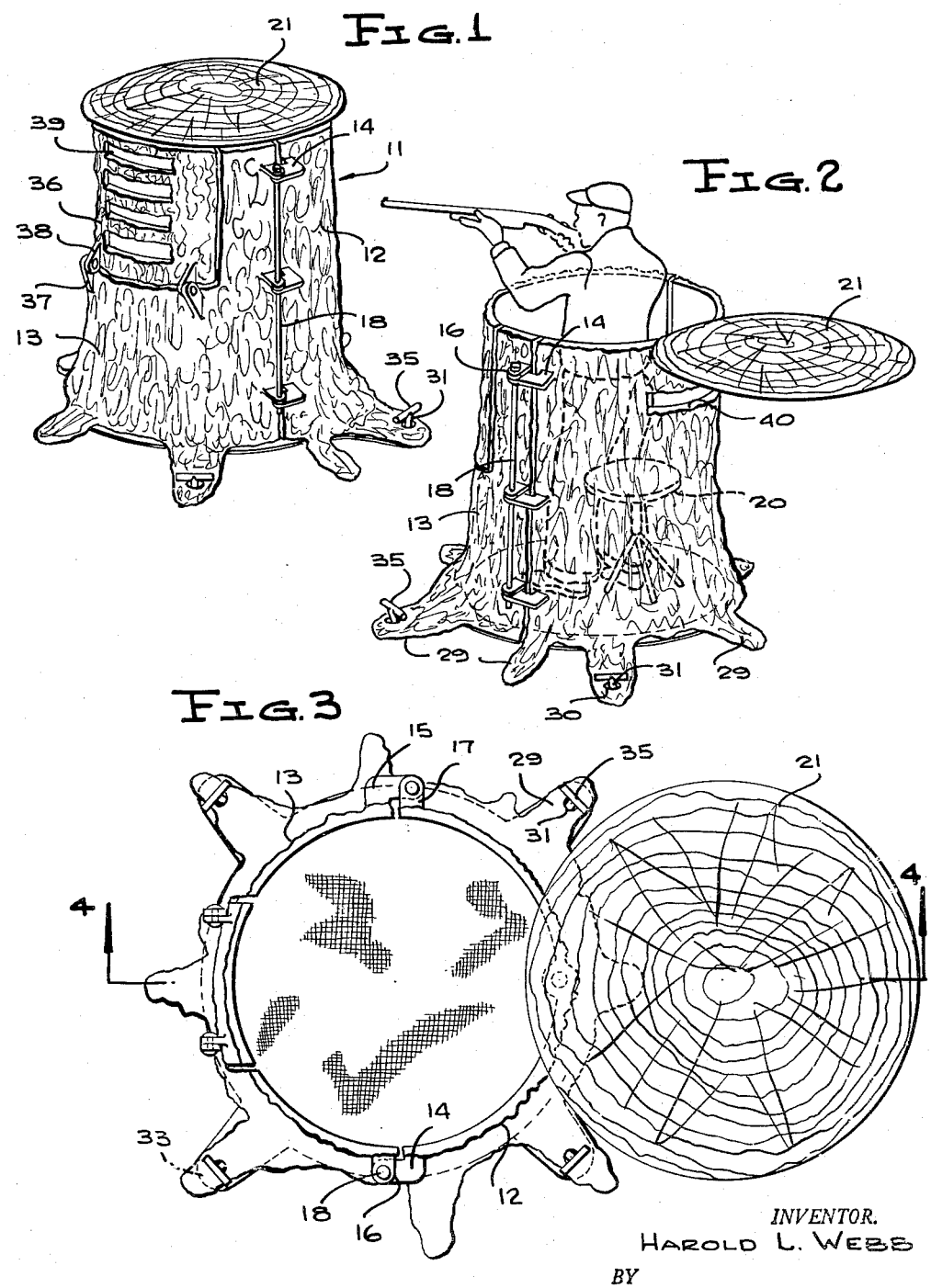
INVENTOR.
HAROLD L. WEBB
BY
McMorrow, Berman & Davidson
ATTORNEYS July 18, 1961  H. L. WEBB  2,992,503
GAME BLIND
Filed Sept. 18, 1959  2 Sheets-Sheet 2
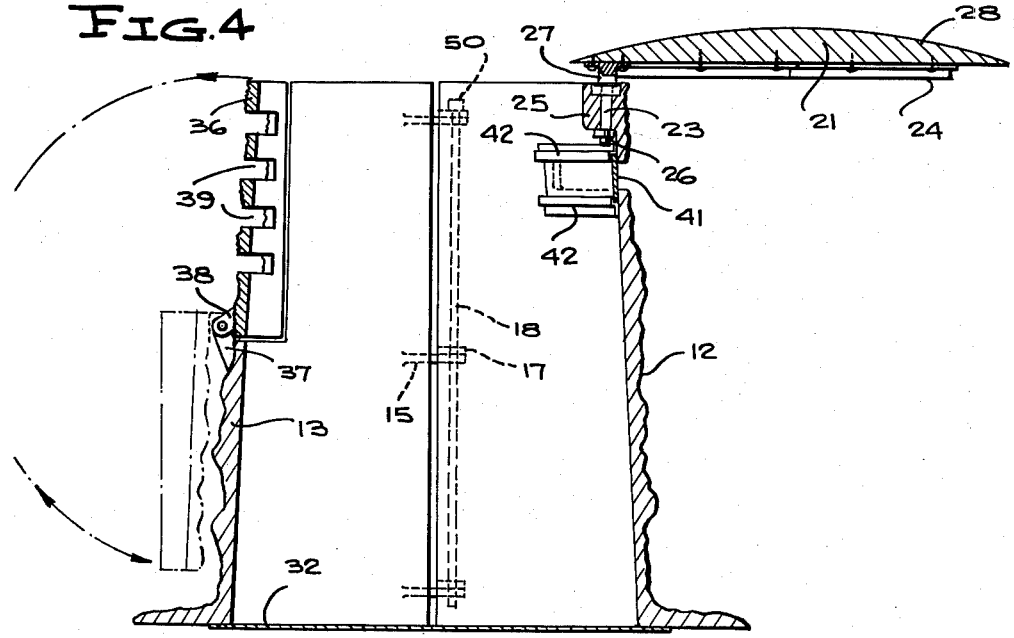
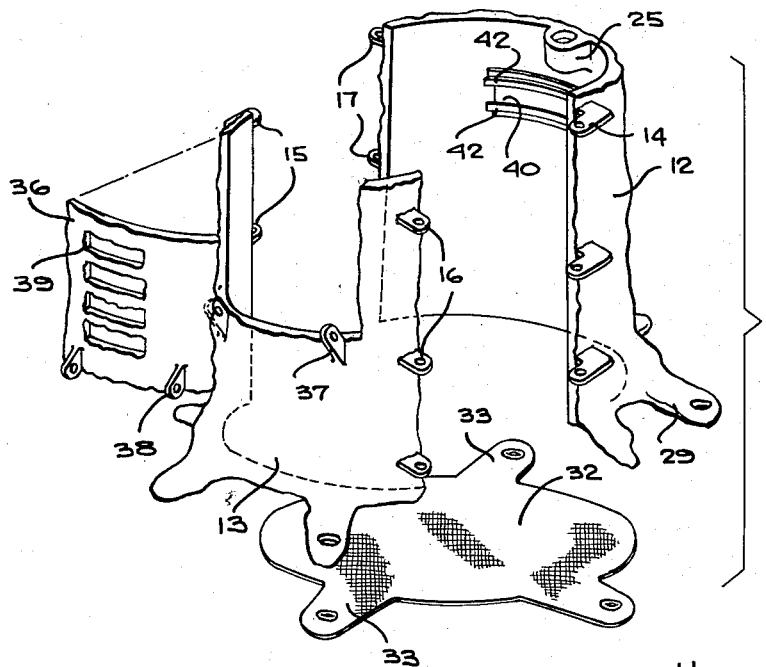
INVENTOR.
HAROLD L. WEBB
BY
McMorrow, Berman & Davidson
ATTORNEYS

United States Patent Office 2,992,503
Patented July 18, 1961

2,992,503
GAME BLIND
Harold L. Webb, Hillcrest Drive, Milan, Tenn.
Filed Sept. 18, 1959, Ser. No. 840,978
2 Claims. (Cl. 43—1)

This invention relates to a blind for concealing a hunter, and more particularly to a game blind simulating the stump of a dead tree.

A main object of the invention is to provide a novel and improved hunter's blind which is simple in construction, which is easy to set up for use, and which provides a comfortable shelter which realistically simulates the stump of a dead tree.

A further object of the invention is to provide an improved hunter's blind which involves relatively inexpensive components, which may be readily taken apart for transportation and storage, which may be quickly and easily set up for use at a desired location, and which provides a high degree of protection of the hunter using same against inclement weather.

Further objects and advantages of the invention will become apparent from the following description and claims, and from the accompanying drawings, wherein:

FIGURE 1 is a perspective view of an improved hunter's blind constructed in accordance with the present invention and shown set up for use.

FIGURE 2 is a perspective view, similar to FIGURE 1, but showing the top cover of the blind swung to an open position, allowing the hunter to stand erect.

FIGURE 3 is an enlarged top plan view of the hunter's blind of FIGURE 2.

FIGURE 4 is a vertical cross sectional view taken substantially on the line 4—4 of FIGURE 3.

FIGURE 5 is a perspective view showing the components of the hunter's blind of FIGURES 1 to 4 in separated positions.

Referring to the drawings, 11 generally designates an improved game blind constructed in accordance with the present invention. The game blind 11 comprises a pair of arcuately curved, rigid, substantially vertical opposing concave segments 12 and 13 having outside surfaces formed to simulate the bark of a tree. The respective segments 12 and 13 are provided at opposite marginal edges with the generally L-shaped, outwardly extending horizontal lugs 14 and 15 which are apertured at their outer end portions. The concave segments 12 and 13 are further formed at opposite marginal edges thereof with outwardly projecting apertured lugs, shown at 16 and 17, located so as to overlie the respective L-shaped apertured lugs 14 and 15 with the apertures in the lugs in registry. Vertical connecting rods 18 are engageable through the registering openings in the lugs so as to detachably connect the opposing segments 12 and 13 at their edges to define an enclosure for a hunter. Thus, the segments are of sufficient size so that the enclosure thus defined will be large enough to receive a hunter in a sitting position and for this purpose, a suitable stool 20 may be provided in the enclosure.

Designated at 21 is a generally circular rigid top cover of sufficient diameter to overlie the enclosure defined by the connected opposing segments 12 and 13, the cover being preferably slightly larger in diameter than the top end of said enclosure, whereby the peripheral edges of the cover 21 will extend beyond the rim of the enclosure when the cover is in a closed position, such as that shown in FIGURE 1. The cover 21 is pivotally connected to the intermediate portion of the top edge of the segment 12, as by a shouldered pivot stud 23 which is integrally formed on an annular ring member 24 secured to the bottom surface of the cover 21, as shown in FIGURE 4, the stud 23 depending from the ring member 24 and being received in an apertured lug 25 integrally formed in the intermediate portion of the top rim of the concave segment 12. A fastening nut 26 is threadedly engaged on the bottom end of the stud 23, whereby the stud may be secured to the lug 25 with the shoulder 27 thereof in abutment with the top surface of the lug, providing a bearing for rotatably supporting the cover 21 for swinging movement in a horizontal plane.

The circular top cover 21 is provided with the upwardly convex top surface 28, serving as a moisture-shedding surface for the enclosure when the cover 21 is disposed in overlying relationship thereto.

As previously mentioned, the outside surfaces of the segments 12 and 13 are suitably roughened and molded to simulate the bark of a tree and are suitably colored in accordance with the actual color of tree bark. The top cover 21 is also decorated to simulate a cut section of a tree, namely, is inscribed with the annual rings which appear on a cut section of a tree, whereby to increase the resemblance of the device to an actual tree stump.

The segments 12 and 13 preferably are of increasing diameter downwardly, so that the bottom portion of the enclosure flares downwardly in diameter, and the segments are formed at their bases with outwardly extending lug elements 29 simulating tree roots. Certain of the elements 29 are formed with anchoring apertures 30 through which suitable headed anchoring stakes 31 may be driven to anchor the hunter's blind to the ground in its desired location. A floor mat 32 of suitable flexible material, such as heavy canvas or the like is provided in the bottom of the enclosure, the floor mat 32 being formed at its periphery with a plurality of outwardly extending apertured flaps 33 registrable with the apertured lugs 29 provided on the segments 12 and 13, whereby the anchor stakes 31 may be engaged simultaneously through the apertured flaps 33 as well as through the apertured lugs 29, whereby to fasten the floor mat 32 in the bottom of the enclosure defined by the connected opposing concave segments 12 and 13.

As shown in FIGURE 2, the anchoring stakes 31 may comprise pointed rods having transversely extending horizontal head portions 35 which may be employed as handles for pushing the stakes into the ground and for removing same.

The concave segment 13 is provided at its upper portion with a hinged door 36 of substantial size, said hinged door being, for example, approximately one-half the height of the segment 13 and being arranged so that its top edge merges with the rim of the segment 13. The hinged door 36 is connected at its bottom margin to hinge lugs 37, 37 provided on the segment 13, cooperating hinge lugs 38, 38 being provided on the bottom margin of the door 36, the hinge lugs 38 being pivotally connected to the hinge lugs 37 on a common transverse horizontal axis, so that the door 36 may be at times swung outwardly with respect to the segment 13, for example, to the depending open position thereof illustrated in dotted view in FIGURE 4. When swung to said open position, the door thus provides access to the interior of the enclosure, allowing a hunter to enter or leave same, the top cover 21 being of course swung to an open position under these conditions.

The hinged door 36 is provided with a plurality of vertically spaced, horizontally extending slots 39 of substantial height and width, allowing a hunter using the blind to observe the area faced by the segment 13. The opposing segment 12 is also provided with a horizontal viewing slot 40 of substantial height and width, allowing the hunter to observe the area faced by the segment 12 and opposite to that faced by the segment 13. As shown in FIGURES 4 and 5, the viewing slot 40 may be provided with a transparent covering 41 of transparent plastic material or other suitable transparent material, the covering 41 being arcuately curved and being supported over the slot 40 in opposing angle brackets 42, 42 secured to the inside surface of the segment 12 at the top and bottom margins of slot 40.

As shown in FIGURE 4, the segment-connecting rods 18 are of sufficient length to pass through the registering apertured lugs 15, 17 and 14, 16 the rods being provided with stop heads 50 at their top ends which support the rods in their connecting positions. The rods 18 may be readily pulled out when it is desired to disconnect the segments 12 and 13.

As will be readily apparent, when the device is disassembled, the parts may be easily transported or stored, since the segments 12 and 13 are substantially nestable with respect to each other and since the top cover 21 may be easily unfastened from the segment 12. When it is desired to use the game blind, the segments 12 and 13 are secured together by means of the rods 18 and the floor mat 32 is placed in a position wherein its apertured flap elements 33 register with the apertured base lugs 29 of the segments 12 and 13, after which the anchoring stakes 31 may be forced into the ground through the registering apertures of the lugs 29 and the flaps 33. The top cover 21 may be fastened to the lug 25, after which the blind is ready for use. By opening the hinged door 36, a hunter may enter the enclosure defined between the segments 12 and 13, and the top cover 21 may be then swung to a position covering the enclosure, after the hinged door 36 has been elevated to its closed position, whereupon the hunter may remain in the blind in a concealed position, protected from the weather. The slots 39 and 40 permit observation on opposite sides of the blind, and in the event that the hunter desires to stand erect, for example, to shoot game, he may quickly rotate the top cover 21 to an open position, such as that shown in FIGURE 2, allowing him to stand erect.

The segments 12 and 13 may be constructed of any suitable material, such as paper pulp, light metal, or plastic material. The segments may be finished on their external surfaces with a covering resembling the bark of any suitable tree, such as an Oak, Cyprus, or other tree common to the region where the blind is to be employed. The root-simulating base lugs 29 provide stability and balance to the assembled enclosure, as well as providing means for anchoring the device to the ground.

As will be readily apparent, the hunter's blind device above described is suitable for use by hunters when hunting ducks, geese, deer, fowl, or other types of game, when natural concealment is necessary. It can also be employed by photographers or bird watchers when concealment is required.

While a specific embodiment of an improved hunter's blind has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A hunter's blind comprising a plurality of arcuately curved rigid substantially vertical opposing concave segments having an outside surface formed to simulate the bark of a tree, means connecting the segments at their side edges to define an enclosure for a hunter, a generally circular rigid top cover of sufficient diameter to overlie said enclosure, said top cover being provided with an upwardly convex top surface, means pivotally connecting a marginal portion of said top cover to the top edge of one of said segments for horizontal rotation, whereby said top cover may be swung horizontally to a position overlying said enclosure, and whereby said enclosure simulates a tree stump, a plurality of spaced outwardly projecting apertured anchor lugs extending from the bottom edges of the segments and being formed to simulate tree roots, and a flexible floor mat disposed in the bottom of said enclosure and being provided with outwardly extending apertured flaps disposed beneath and registering with said apertured anchoring lugs.

2. A hunter's blind comprising a plurality of arcuately curved, rigid substantially vertical opposing concave segments having an outside surface formed to simulate the bark of a tree, means connecting the segments at their side edges to define an enclosure for a hunter, one of said segments being provided with a movable wall portion hinged at its bottom edge to swing outwardly and being of sufficient size to provide entry to the enclosure, said movable wall portion being formed with vertically spaced horizontal viewing slots, a generally circular rigid top cover of sufficient diameter to overlie said enclosure, said top cover being provided with an upwardly convex top surface, means pivotally connecting a marginal portion of said top cover to the top edge of one of said segments for horizonal rotation, whereby said top cover may be swung horizontally to a position overlying said enclosure, and whereby said enclosure simulates a tree stump, a plurality of spaced outwardly projecting apertured anchoring lugs extending from the bottom edges of the segments and being formed to simulate tree roots, and a flexible floor mat disposed in the bottom of said enclosure and being provided with outwardly extending apertured flaps disposed beneath and registering with said apertured anchoring lugs.

References Cited in the file of this patent

UNITED STATES PATENTS

| 66,631 | Ripley | July 9, 1867 |
| 1,253,964 | Hack | Jan. 15, 1918 |
| 1,497,535 | Bell | June 10, 1924 |
| 2,827,729 | Hoene | Mar. 25, 1958 |

FOREIGN PATENTS

| 844,884 | France | May 1, 1939 |